(12) United States Patent
Wang

(10) Patent No.: US 8,077,452 B2
(45) Date of Patent: Dec. 13, 2011

(54) FACE PANEL FOR A COMPUTER HOUSING

(75) Inventor: Jo-Chiao Wang, Taipei Hsien (TW)

(73) Assignee: Aopen Inc. (TW)

( * ) Notice: Subject to any disclaimer, the term of this patent is extended or adjusted under 35 U.S.C. 154(b) by 163 days.

(21) Appl. No.: 12/546,634

(22) Filed: Aug. 24, 2009

(65) Prior Publication Data

US 2010/0053887 A1 Mar. 4, 2010

(30) Foreign Application Priority Data

Aug. 26, 2008 (TW) .................................. 97215319

(51) Int. Cl.
*G06F 1/16* (2006.01)
*H05K 5/00* (2006.01)
*H05K 7/00* (2006.01)

(52) U.S. Cl. .................................. 361/679.4; 361/679.6

(58) Field of Classification Search ............. 361/679.02, 361/679.33, 679.4, 679.6

See application file for complete search history.

(56) References Cited

U.S. PATENT DOCUMENTS

| | | | | |
|---|---|---|---|---|
| 5,199,776 A * | 4/1993 | Lin | ............................. | 312/293.3 |
| 5,423,605 A * | 6/1995 | Liu | ............................. | 312/265.6 |
| 5,654,874 A * | 8/1997 | Suzuki | ..................... | 361/679.32 |
| 5,783,777 A * | 7/1998 | Kruse et al. | ...................... | 174/66 |
| 5,986,881 A * | 11/1999 | Yang | ......................... | 361/679.32 |
| 6,102,501 A * | 8/2000 | Chen et al. | ................. | 312/223.2 |
| 6,278,606 B1 * | 8/2001 | Schmitt et al. | ............ | 361/679.35 |
| 6,373,695 B1 * | 4/2002 | Cheng | ....................... | 361/679.39 |
| 6,390,320 B2 * | 5/2002 | Hurst et al. | ..................... | 220/241 |
| 6,590,848 B1 * | 7/2003 | Chen | ............................ | 720/654 |
| 6,601,932 B1 * | 8/2003 | Helgenberg et al. | ........ | 312/265.4 |
| 6,940,731 B2 * | 9/2005 | Davis et al. | ..................... | 361/801 |
| 7,133,290 B2 * | 11/2006 | Junkins et al. | ................ | 361/726 |
| 7,327,585 B1 * | 2/2008 | Fan et al. | ....................... | 361/816 |
| 7,447,016 B2 * | 11/2008 | Tsai et al. | ................. | 361/679.33 |
| 7,561,444 B2 * | 7/2009 | He | ................. | 361/818 |
| 2003/0099094 A1 * | 5/2003 | Coles et al. | .................... | 361/726 |
| 2004/0022034 A1 * | 2/2004 | Coles et al. | .................... | 361/726 |
| 2004/0120107 A1 * | 6/2004 | Davis et al. | .................... | 361/683 |
| 2004/0233619 A1 * | 11/2004 | Heistand et al. | .............. | 361/679 |
| 2008/0024969 A1 * | 1/2008 | Sun et al. | ....................... | 361/683 |
| 2008/0130216 A1 * | 6/2008 | Tsai et al. | ...................... | 361/685 |
| 2010/0052484 A1 * | 3/2010 | Wang et al. | ................. | 312/223.2 |

* cited by examiner

*Primary Examiner* — Jinhee Lee
*Assistant Examiner* — Adrian S Wilson
(74) *Attorney, Agent, or Firm* — The Mueller Law Offices, P.C.

(57) ABSTRACT

A face panel for a computer housing includes a face panel body and a cover plate assembly. The face panel body includes a surrounding wall having first and second engaging grooves, and a mounting hole. The cover plate assembly is provided in the mounting hole and is assembled to the surrounding wall, and includes a cover plate having a through hole and a first engaging hook for engaging the first engaging groove, and a locking member having a fixed block coupled to the cover plate, a slide block, and a resilient connecting portion interconnecting the fixed and slide blocks to provide the slide block with a restoring force. The slide block includes a second engaging hook for engaging the second engaging groove, and a press portion exposed through the through hole and pressible to enable the second engaging hook to disengage from the second engaging groove.

13 Claims, 13 Drawing Sheets

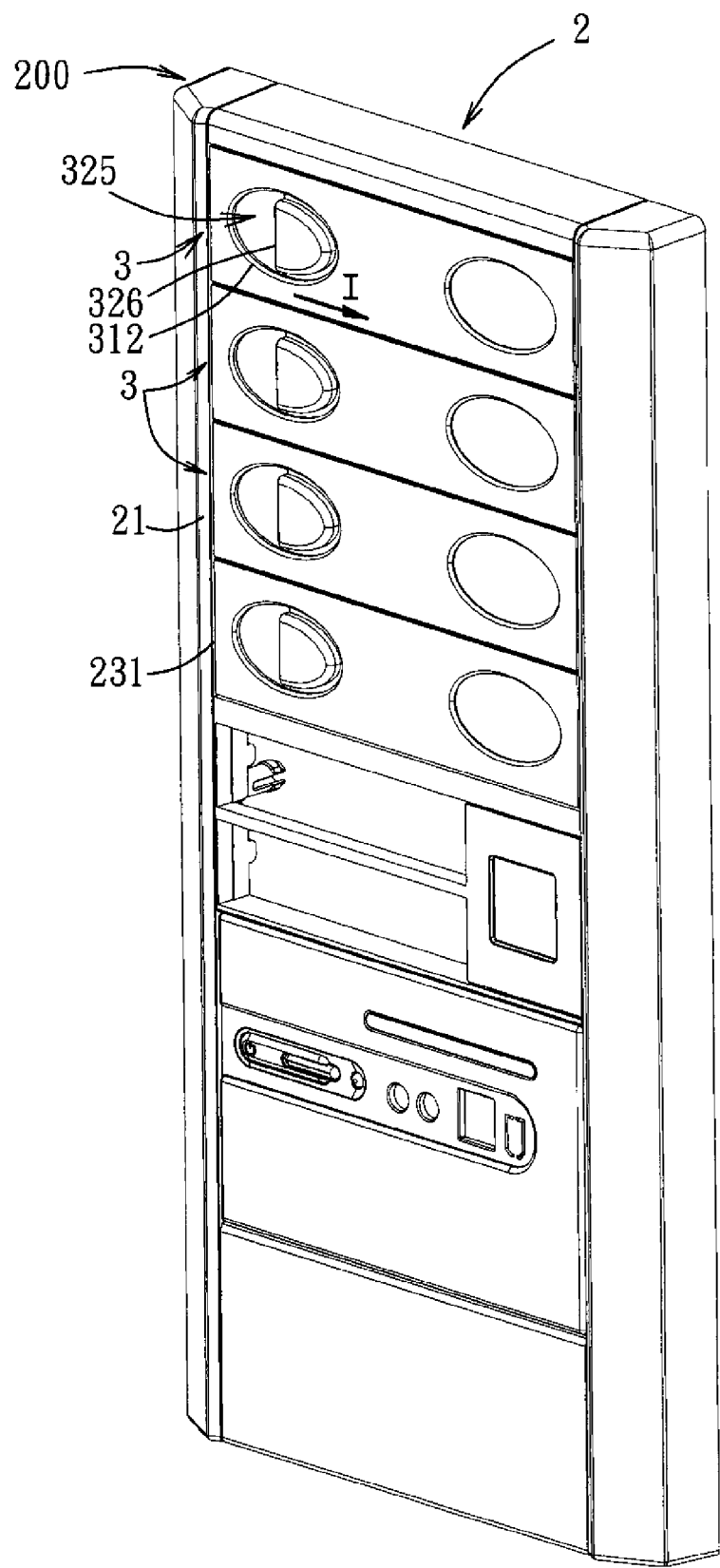
F I G. 4

FACE PANEL FOR A COMPUTER HOUSING

CROSS-REFERENCE TO RELATED APPLICATION

This application claims priority of Taiwanese Application No. 097215319, filed on Aug. 26, 2008.

BACKGROUND OF THE INVENTION

1. Field of the Invention

The invention relates to a face panel for a computer housing, more particularly to a face panel for a computer housing which has a mounting hole for insertion of a data access device and which permits a cover plate assembly to be mounted in the mounting hole.

2. Description of the Related Art

Referring to FIGS. 1, 2, and 3, a face panel 1 of a conventional computer housing includes a face panel body 11, and a plurality of covers 12 removably assembled to the face panel body 11. The face panel body 11 includes an upright wall 111, a mounting hole 113 formed in the upright wall 111, and a surrounding wall 112 projecting rearwardly from the upright wall 111 and defining the mounting hole 113. The surrounding wall 112 is for mounting of data access devices, such as an optical disk drive, therein. The surrounding wall 112 has two shoulder portions 114 located respectively at left and right sides thereof and at an intermediate part. Each of the covers 12 includes a cover plate 121 mounted in the mounting hole 113, and two pairs of engaging hooks 122 projecting from a rear side of the respective cover plate 121 for engaging a rear end of the surrounding wall 112. Each of the engaging hooks 122 has a resilient arm 123 projecting rearwardly from the respective cover plate 121, and an engaging portion 124 projecting from a distal end of the resilient arm 123.

Each of the covers 12 is retained and secured on the face panel body 11 when a rear end of the cover plate 121 thereof abuts against the shoulder portions 114 of the surrounding wall 112 and when the engaging portions 124 of the engaging hooks 122 thereof engage the rear end of the surrounding wall 112. When it is desired to remove the cover 12, a user needs to force the engaging portions 124 of each of the pairs of engaging hooks 122 inwardly at the same time from a rear side of the face panel body 11 to disengage the engaging portions 124 of the engaging hooks 122 from the rear end of the surrounding wall 112 in order to detach the cover 12 from the face panel body 11.

However, the configuration of the engaging hooks 122 of the covers 12 requires that the removal operation of the covers 12 be conducted from the rear side of the face panel body 11. The removal operation cannot be conducted from a front side of the face panel body 11, which is inconvenient for the user during removal. Furthermore, if a force is improperly applied by the user during removal of the covers 12, breaking of the engaging hooks 122 may occur, thereby rendering it impossible to re-assemble the covers 12 to the face panel body 11.

SUMMARY OF THE INVENTION

Therefore, the main object of the present invention is to provide a face panel for a computer housing. The face panel has a cover plate assembly that can be quickly and conveniently assembled to or disassembled from a face panel body.

The aforesaid object of the present invention and solutions to technical problems associated therewith are realized using the technical means described hereinbelow. The face panel for a computer housing as disclosed in this invention includes a face panel body and a cover plate assembly.

The face panel body includes a surrounding wall, and a mounting hole having a forward opening and defined by the surrounding wall. The surrounding wall has a first engaging groove and a second engaging groove located respectively at left and right sides thereof. The cover plate assembly is provided in the mounting hole and is assembled to the surrounding wall. The cover plate assembly includes a cover plate and a locking member. The cover plate has a through hole extending in a front-rear direction, and a first engaging hook for engaging the first engaging groove. The locking member is assembled to a rear face of the cover plate, and has a fixed block coupled to the cover plate, a slide block spaced apart from the fixed block, and a resilient connecting portion interconnecting the fixed block and the slide block so as to provide the slide block with a restoring resilient force. The slide block includes a second engaging hook for engaging the second engaging groove, and a press portion that is exposed through the through hole and that is pressible to permit disengagement of the second engaging hook from the second engaging groove.

The object of the present invention and the solutions to the technical problems associated therewith may be further realized using the following technical means.

In the aforementioned face panel for a computer housing, the resilient connecting portion may be one or more in number, and may have a curved strip structure interconnecting the fixed block and the slide block so as to provide the slide block with a restoring resilient force.

In the aforementioned face panel for a computer housing, the cover plate further has a plurality of positioning hooks projecting from the rear face thereof. The positioning hooks respectively engage upper and lower ends of the fixed block and upper and lower ends of the slide block so as to couple the fixed block and the slide block of the locking member to the rear face of the cover plate.

In the aforementioned face panel for a computer housing, the press portion is provided to move the second engaging hook toward the fixed block.

In the aforementioned face panel for a computer housing, the cover plate further has a limiting portion provided on the rear face thereof for abutting against a left side of the fixed block so as to position the fixed block on the rear face of the cover plate.

In the aforementioned face panel for a computer housing, the cover plate further has a stop portion provided on the rear face thereof. The slide block abuts against the stop portion to limit movement of the slide block.

In an alternative embodiment of the present invention, the face panel body includes a surrounding wall, and a mounting hole having a forward opening and defined by the surrounding wall. The surrounding wall has two engaging grooves located respectively at left and right sides thereof. The cover plate assembly is provided in the mounting hole and is assembled to the surrounding wall. The cover plate assembly includes a cover plate and a locking member. The cover plate has two through holes extending in a front-rear direction, and a plurality of positioning hooks provided on a rear face thereof and proximate to upper and lower ends thereof. The locking member is assembled to the rear face of the cover plate, and has two spaced-apart slide blocks for engaging the positioning hooks, and a resilient connecting portion interconnecting the slide blocks for providing the slide blocks with a restoring resilient force. Each of the slide blocks includes an engaging hook for engaging a respective one of the engaging grooves, and a press portion exposed through a respective one of the through holes. The press portions of the slide blocks are pressible to permit the slide blocks to move toward each other in a direction of the resilient connecting portion to thereby permit disengagement of the engaging hooks of the slide blocks from the engaging grooves, respectively.

In the aforementioned face panel for a computer housing, the cover plate further has two stop portions provided on the rear face thereof. The slide blocks respectively abut against the stop portions to limit movement of the slide blocks.

In the face panel for a computer housing according to this invention, with the arrangement of the cover plate assembly, the user can use only one finger or two fingers to press the press portion(s) of the slide block(s) to release the locked state between the cover plate assembly and the face panel body. Thus, the cover plate assembly can be quickly and conveniently removed from the front side of the face panel body. In addition, by using the resilient connecting portions to restore the second engaging hooks or the engaging hooks to an engaged position, the cover plate assembly is switchable between locked and unlocked states with respect to the face panel body.

BRIEF DESCRIPTION OF THE DRAWINGS

Other features and advantages of the present invention will become apparent in the following detailed description of the preferred embodiments with reference to the accompanying drawings, of which:

FIG. 4 is a perspective view of the first preferred embodiment of a face panel for a computer housing according to the present invention;

DETAILED DESCRIPTION OF THE PREFERRED EMBODIMENTS

Figure 1:
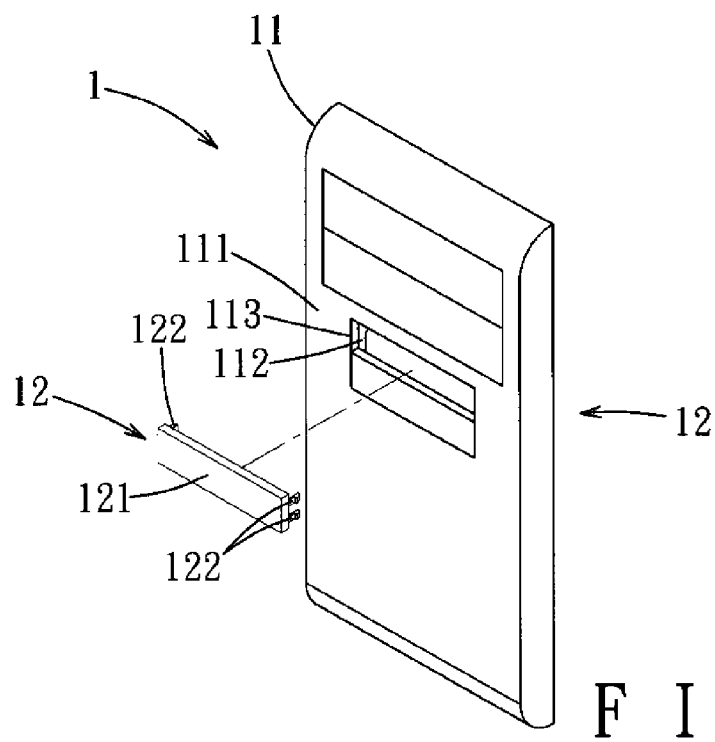
FIG. 1 is a partly exploded perspective view of a conventional face panel for a computer housing.
Figure 2:
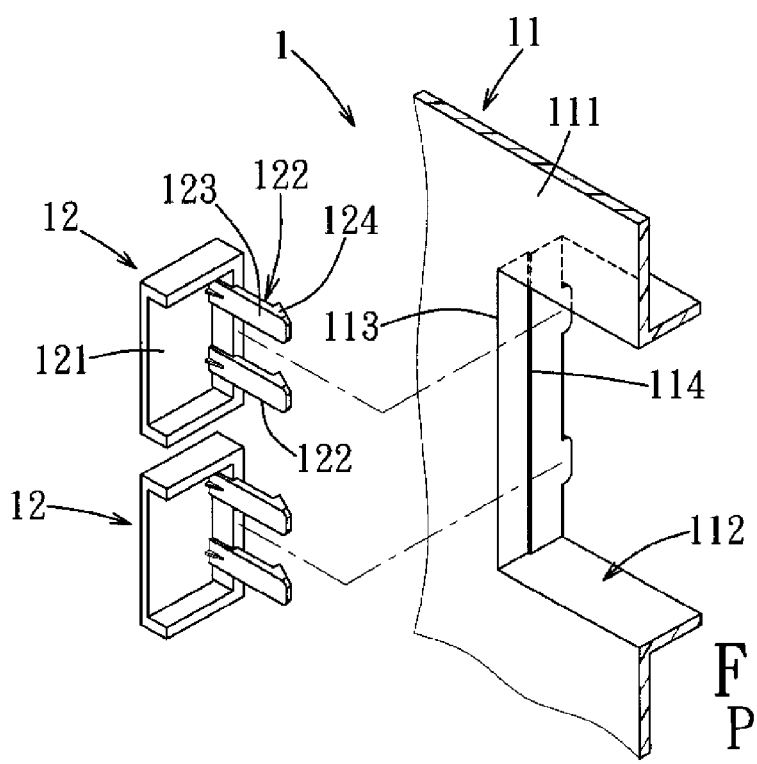
FIG. 2 is a fragmentary exploded perspective view of FIG. 1.
Figure 3:
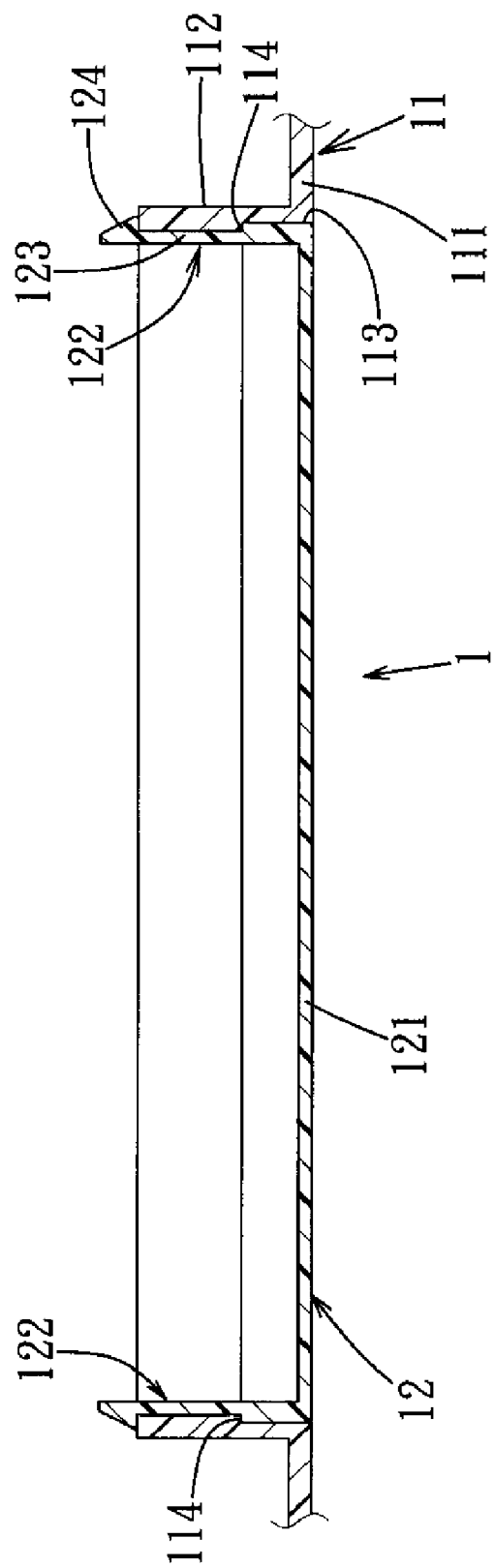
FIG. 3 is a schematic sectional view of FIG. 1 to illustrate assembly of a cover to a face panel body.

Through a detailed description of the preferred embodiments, the technical means adopted to achieve the intended object and advantageous effects of the present invention should be better understood. However, the accompanying drawings are provided for reference and illustration only and should not be based upon to limit the scope of protection sought for the present invention.

Before the present invention is described in greater detail, it should be noted that like elements are denoted by the same reference numerals throughout the disclosure.

Referring to FIG. 4, the first preferred embodiment of a face panel 200 for a computer housing according to the present invention is shown to include a face panel body 2 and a plurality of cover plate assemblies 3 removably assembled to the face panel body 2. Since the cover plate assemblies 3 are identical in structure, to facilitate description and for the sake of clarity, the cover plate assemblies 3, and component parts thereof, are referred to in singular terms, where necessary.

Figure 5:
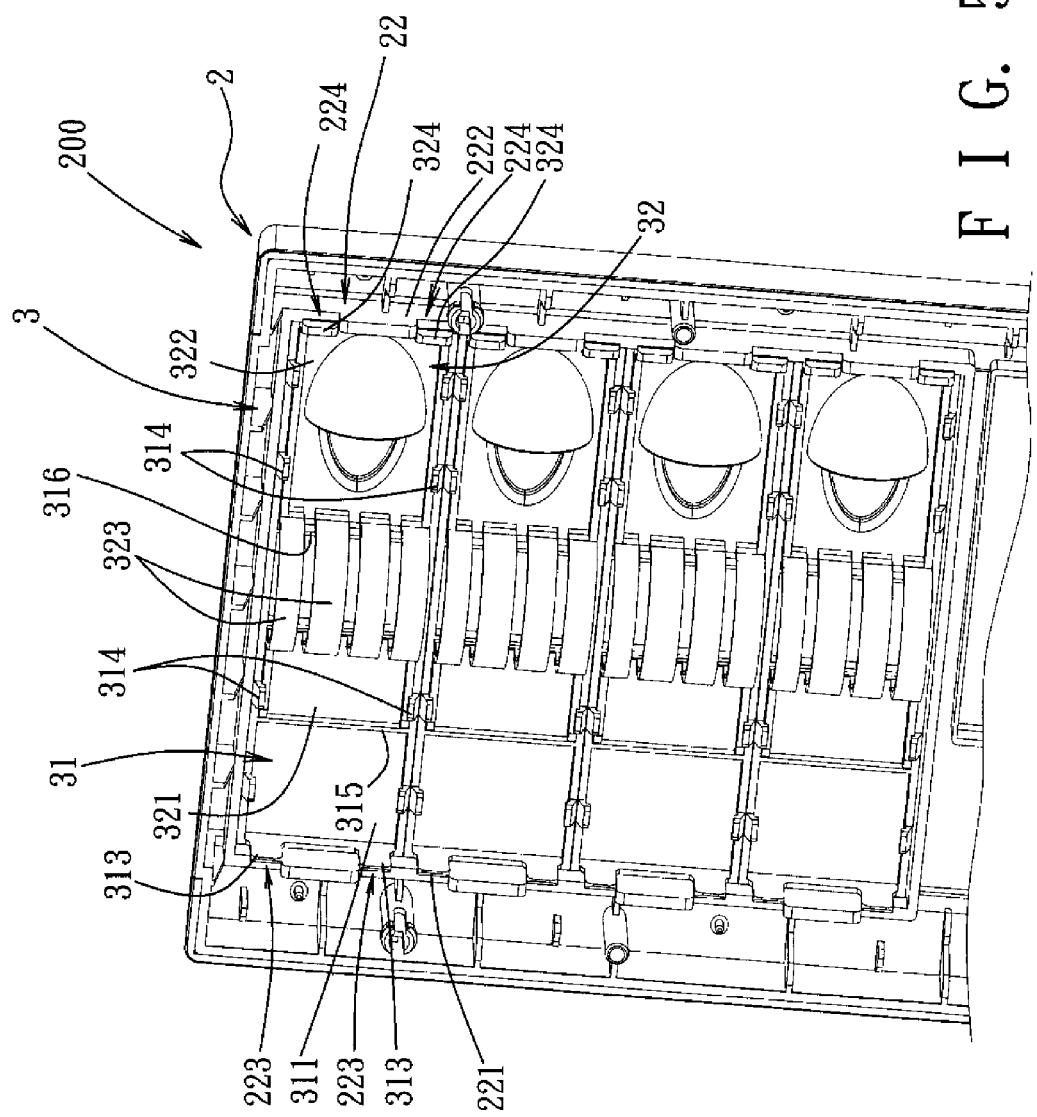
FIG. 5 is a fragmentary enlarged rear perspective view of the first preferred embodiment.
Figure 6:
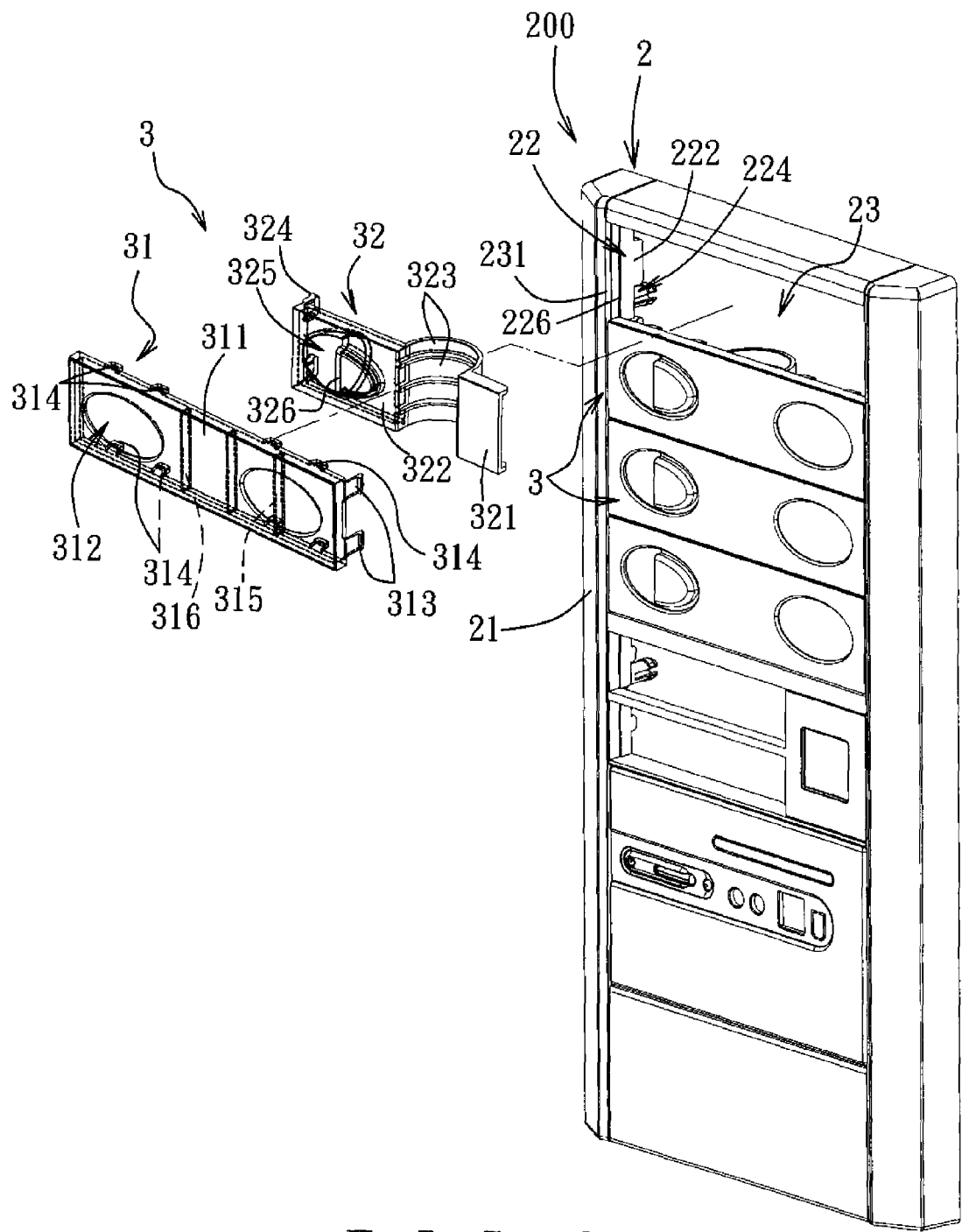
FIG. 6 is an exploded perspective view of the first preferred embodiment to illustrate the assembly relationship between a face panel body and a cover plate assembly.
Figure 7:
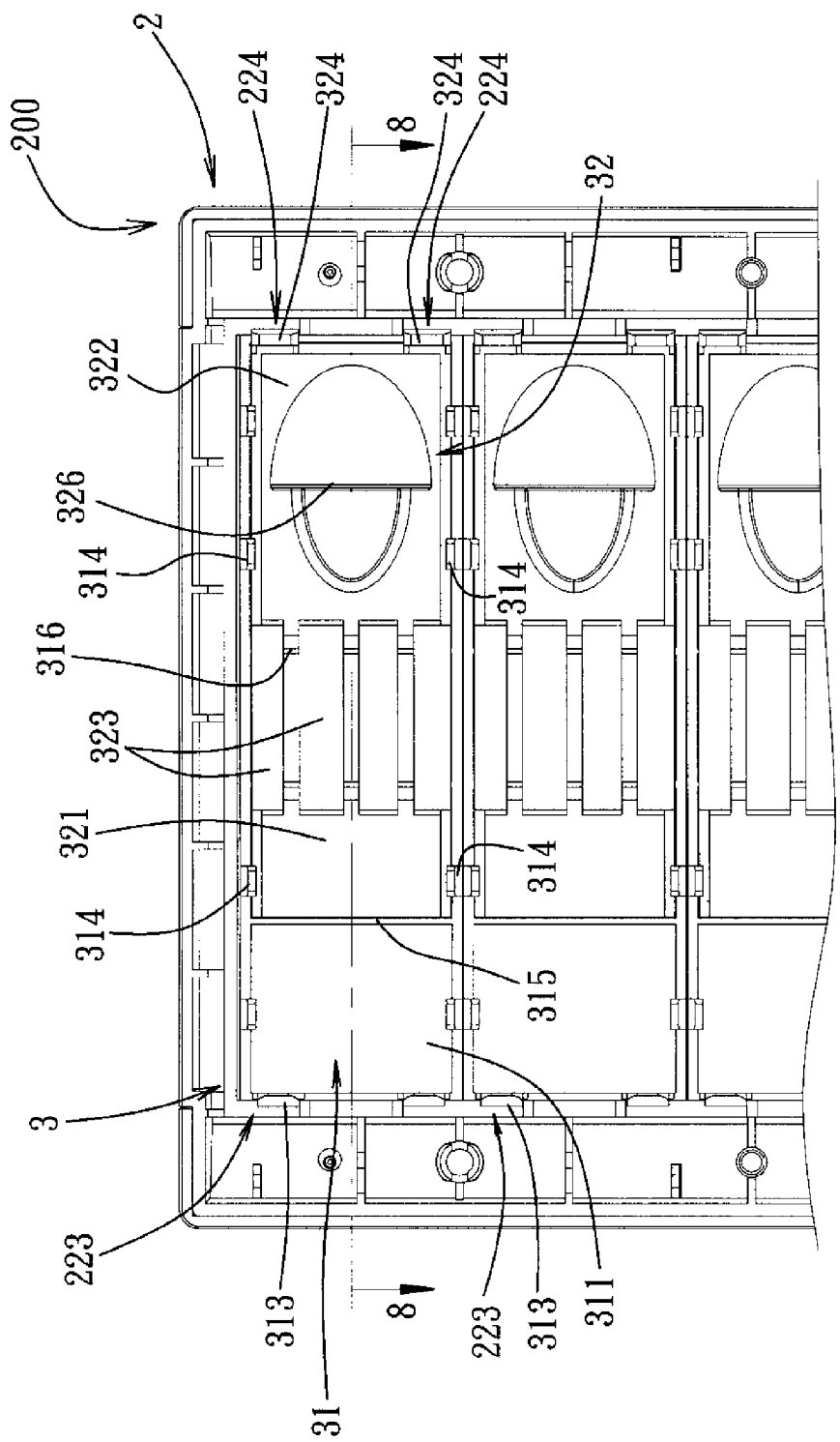
FIG. 7 is a fragmentary enlarged rear view of the first preferred embodiment to illustrate the cover plate assembly and the face panel body in a locked state.
Figure 8:
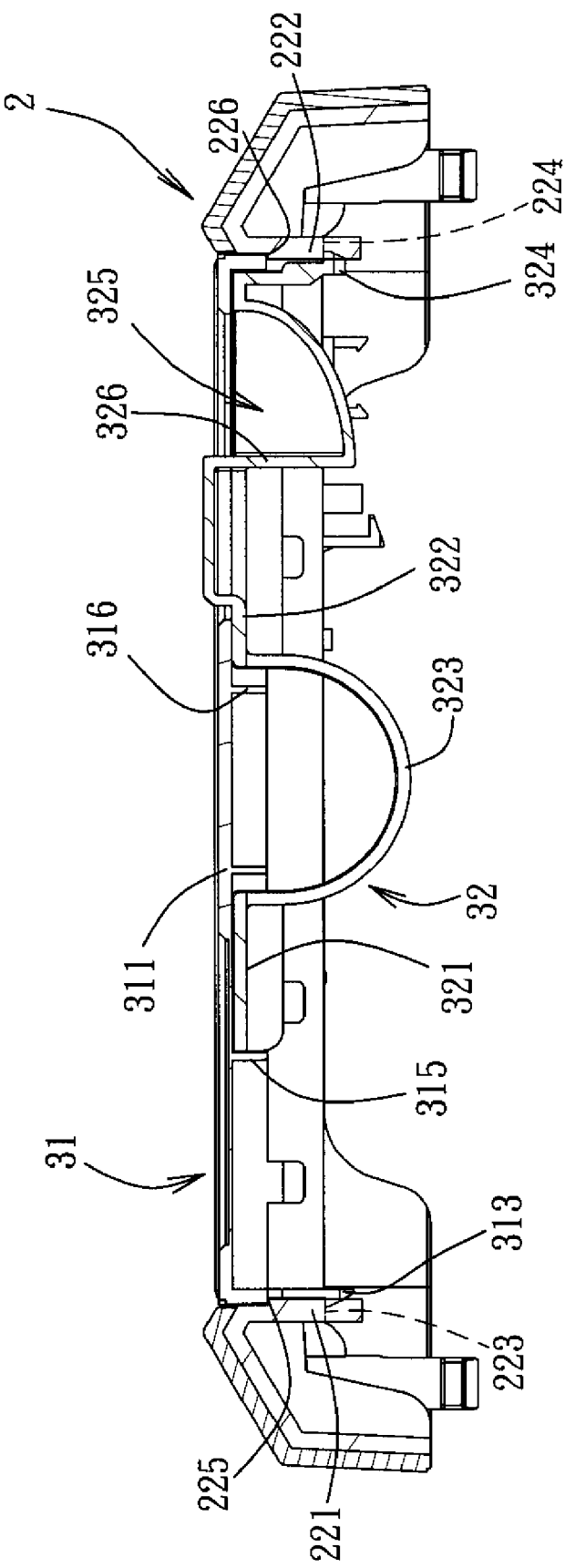
FIG. 8 is a sectional view taken along line 8-8 of FIG. 7, illustrating the cover plate assembly and the face panel body in the locked state.

Reference is made to FIGS. 4, 5, 6 and 7. In the following description, the part of the face panel body 2 on the right side of the rear view of FIG. 5 is referred to as the right side, and the part of the face panel body 2 on the left side of the rear view of FIG. 5 is referred to as the left side. The face panel body 2 includes an upright front wall 21, a mounting hole 23 formed in the front wall 21, and a surrounding wall 22 extending rearwardly from the front wall 21 and defining the mounting hole 23. The mounting hole 23 has an opening 231 oriented forwardly, and is provided for mounting of the cover plate assemblies 3 therein. The surrounding wall 22 has a left side wall portion 221 and a right side wall portion 222 located respectively at left and right sides thereof, a plurality of first engaging grooves 223 formed in the left side wall portion 221 and spaced apart from each other, and a plurality of second engaging grooves 224 formed in the right side wall portion 222 at positions corresponding to those of the first engaging grooves 223.

The cover plate assemblies 3 are mounted in the mounting hole 23 and are assembled to the surrounding wall 22. Each of the cover plate assemblies 3 includes a cover plate 31, and a locking member 32 assembled to the cover plate 31. The cover plate 31 has a plate body 311, a through hole 312 extending through the plate body 311 in a front-rear direction, and two first engaging hooks 313 that project rearwardly from a rear face of the plate body 311 proximate to a left side thereof and that are spaced apart with one above the other. Each of the first engaging hooks 313 is used to engage a respective one of the first engaging grooves 223 in the left side wall portion 221. The cover plate 31 further has a plurality of positioning hooks 314 projecting respectively and rearwardly from the rear face of the plate body 311 proximate to upper and lower ends of the plate body 311 for engaging the locking member 32.

Referring to FIGS. 5, 6, 7, and 8, the locking member 32 is formed from a plastic material, and has a fixed block 321, a slide block 322 spaced apart from and located on the right side of the fixed block 321, and a plurality of resilient connecting portions 323 spaced apart from each other and interconnecting the fixed block 321 and the slide block 322. The positioning hooks 314 of the cover plate 31 are respectively engaged with upper and lower ends of the fixed block 321 and upper and lower ends of the slide block 322. The fixed block 321 has a left side abutting against a limiting portion 315 in the form of an elongated rib on the rear face of the plate body 311. The slide block 322 includes two second engaging hooks 324 that project rearwardly from a rear face thereof proximate to a right end thereof and that are spaced apart with one above the other, and a recess 325 that is curved and that is exposed through the through hole 312. Each of the second engaging hooks 324 is used to engage a respective one of the second engaging grooves 224 in the right side wall portion 222. The slide block 322 has an upright wall surface and a curved wall surface defining the recess 325. The upright wall surface extends in the front-rear direction and defines a press portion 326 for pressing by the user. The user can put a finger into the recess 325 to press the press portion 326 so as to push the slide block 322 toward the fixed block 321 to thereby disengage the second engaging hooks 324 from the second engaging grooves 224, respectively. Each of the resilient connecting portions 323 is a curved strip that is curved rearwardly, and that is integrally formed with and that is connected to a right end of the fixed block 321 and a left end of the slide block 322. By virtue of the resilient force exerted by the resilient connecting portions 323 on the fixed block 321 and the slide block 322, the fixed block 321 may abut against the limiting portion 315 to thereby provide the slide block 322 with a restoring resilient force.

When the first engaging hooks 313 of the cover plate 31 are respectively engaged with the first engaging grooves 223, with left and right rear ends of the plate body 311 of the cover plate 31 abutting against shoulder portions 225, 226 (see FIG. 8) of the left and right side wall portions 221, 222, due to the resilient force vested in the resilient connecting portions 323, the fixed block 321 is constantly urged against the limiting portion 315, and the second engaging hooks 324 of the slide block 322 are respectively engaged with the second engaging grooves 224. Thus, the cover plate assembly 3 and the face panel body 2 are placed in a locked state.

Figure 9:
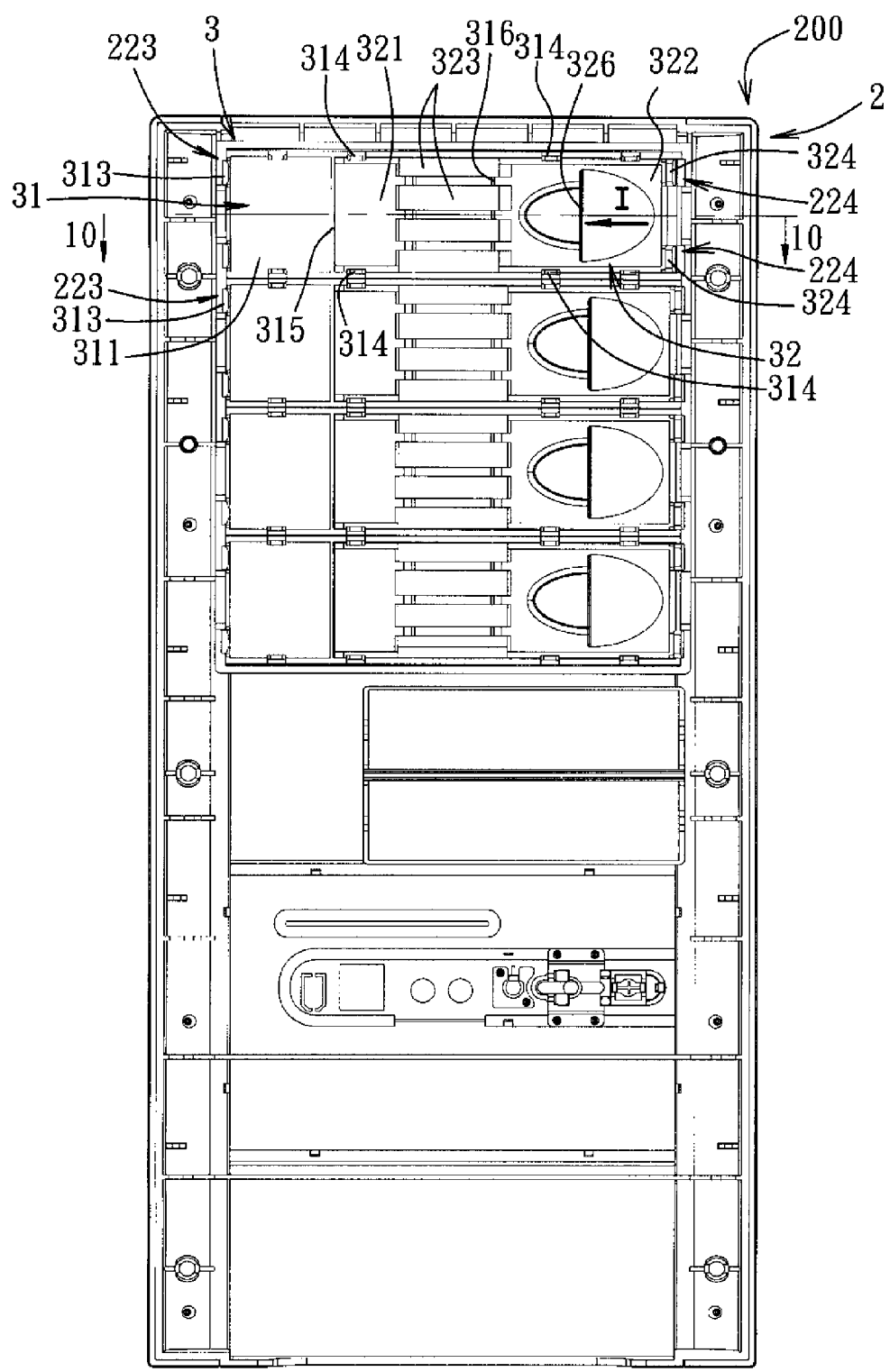
FIG. 9 is a rear view of the first preferred embodiment to illustrate the cover plate assembly and the face panel in an unlocked state.
Figure 10:
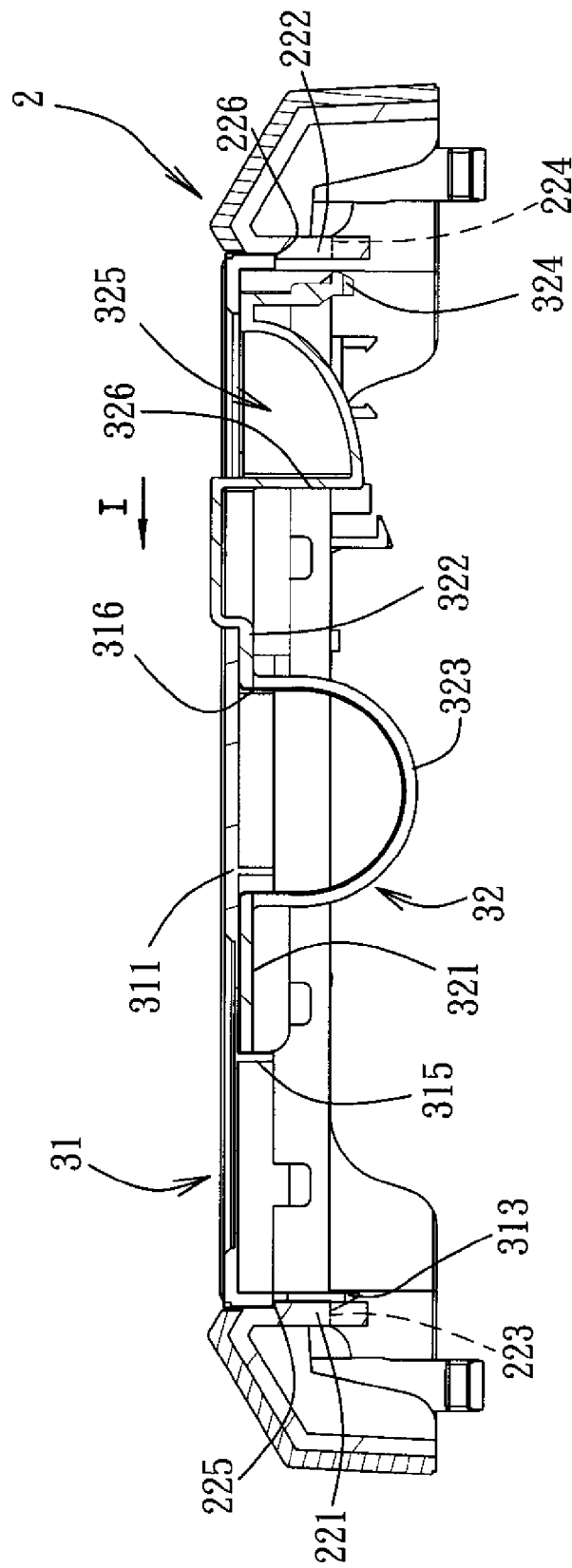
FIG. 10 is a sectional view taken along line 10-10 of FIG. 9, illustrating the cover plate assembly and the face panel body in the unlocked state.
Figure 11:
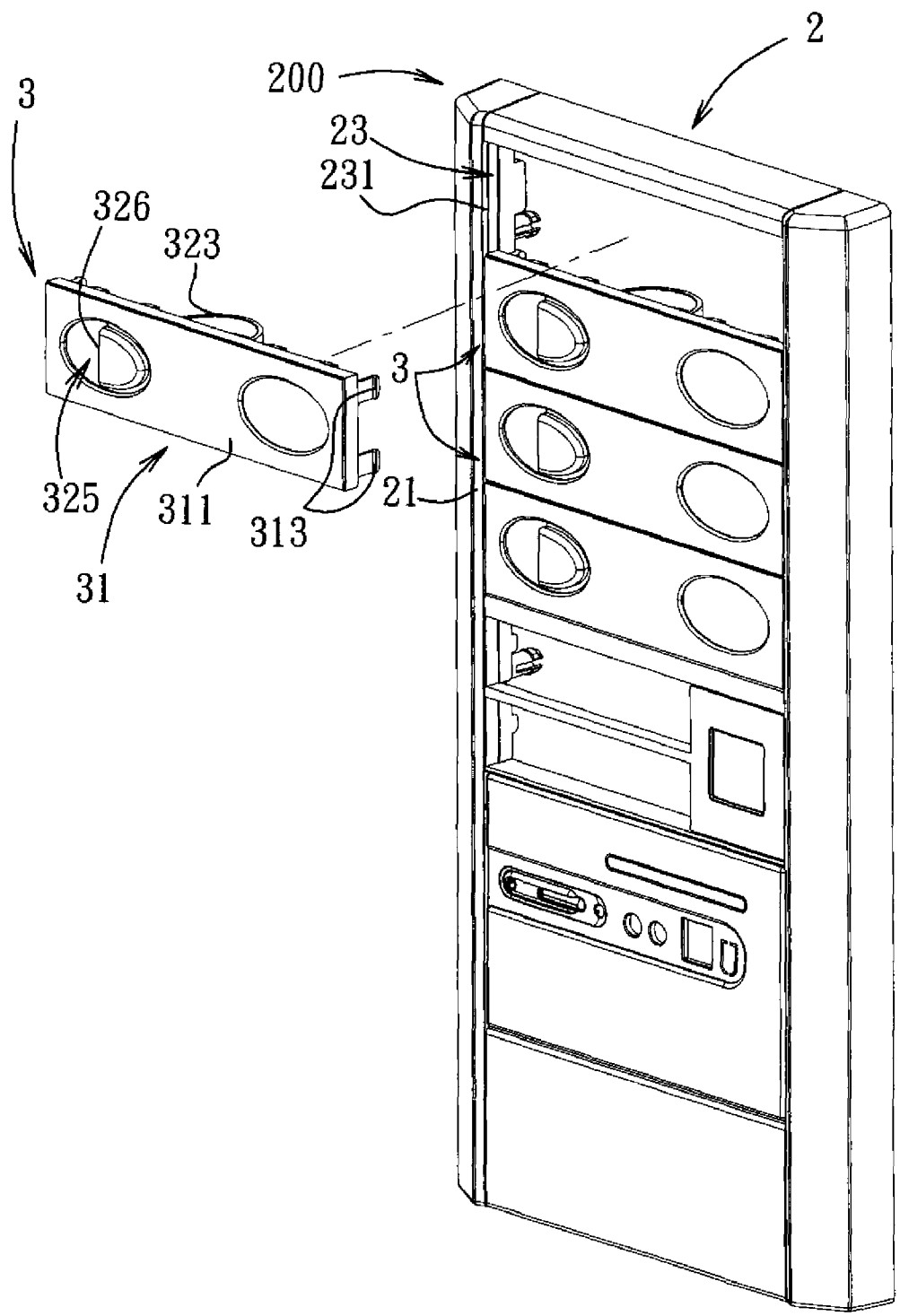
FIG. 11 is a perspective view of the first preferred embodiment to illustrate how the cover plate assembly is removed from a mounting hole through an opening in the unlocked state.

Referring to FIGS. 4, 9 and 10, when the user puts a finger into the recess 325 to press the press portion 326 in a direction indicated by arrow (I), the slide block 322 will bring the second engaging hooks 324 to move toward the fixed block 321 and to compress the resilient connecting portions 323 so that the resilient connecting portions 323 are deformed. When the left end of the slide block 322 abuts against a stop portion 316 in the form of a rib on the rear face of the plate body 311, the slide block 322 is prevented from moving any further. At this time, the second engaging hooks 324 of the slide block 322 are completely disengaged from the second engaging grooves 224, thereby placing the cover plate assembly 3 and the face panel body 2 in an unlocked state. In the unlocked state, the user can pull the cover plate 31 of the cover plate assembly 3 forwardly from the right side. When the first engaging hooks 313 of the cover plate 31 are completely disengaged from the first engaging grooves 223, the user may remove the cover plate assembly 3 through the opening 231 of the mounting hole 23, as shown in FIG. 11.

In addition, when it is desired to re-assemble the cover plate assembly 3 to the face panel body 2, the cover plate assembly 3 is inserted into the mounting hole 23 via the opening 231. When the second engaging hooks 324 of the locking member 32 contact the right side wall portion 222, the slide block 322 is forced to move to the left and compresses the resilient connecting portions 323. Upon movement of the first engaging hooks 313 of the cover plate 31 to where the first engaging grooves 223 are, the first engaging hooks 313 will respectively engage the first engaging grooves 223. When the second engaging hooks 324 of the slide block 322 are moved to where the second engaging grooves 224 are, the restoring resilient force of the resilient connecting portions 323 will bring the second engaging hooks 324 into engagement with the second engaging grooves 224. Thus, the cover plate assembly 3 and the face panel body 2 are once again placed in the locked state.

It is worth noting that, in this embodiment, there may be provided only one resilient connecting portion 323 to achieve the same effect of providing the slide block 322 with a restoring resilient force. However, the arrangement of a plurality of resilient connecting portions 323 as in this embodiment is preferred so as to provide a better restoring resilient effect. In addition, the resilient connecting portions 323 may be configured to be a single compression spring, and should not be limited to the configuration of being integrally formed with the fixed block 321 and the slide block 322 as disclosed in this embodiment.

Figure 12:
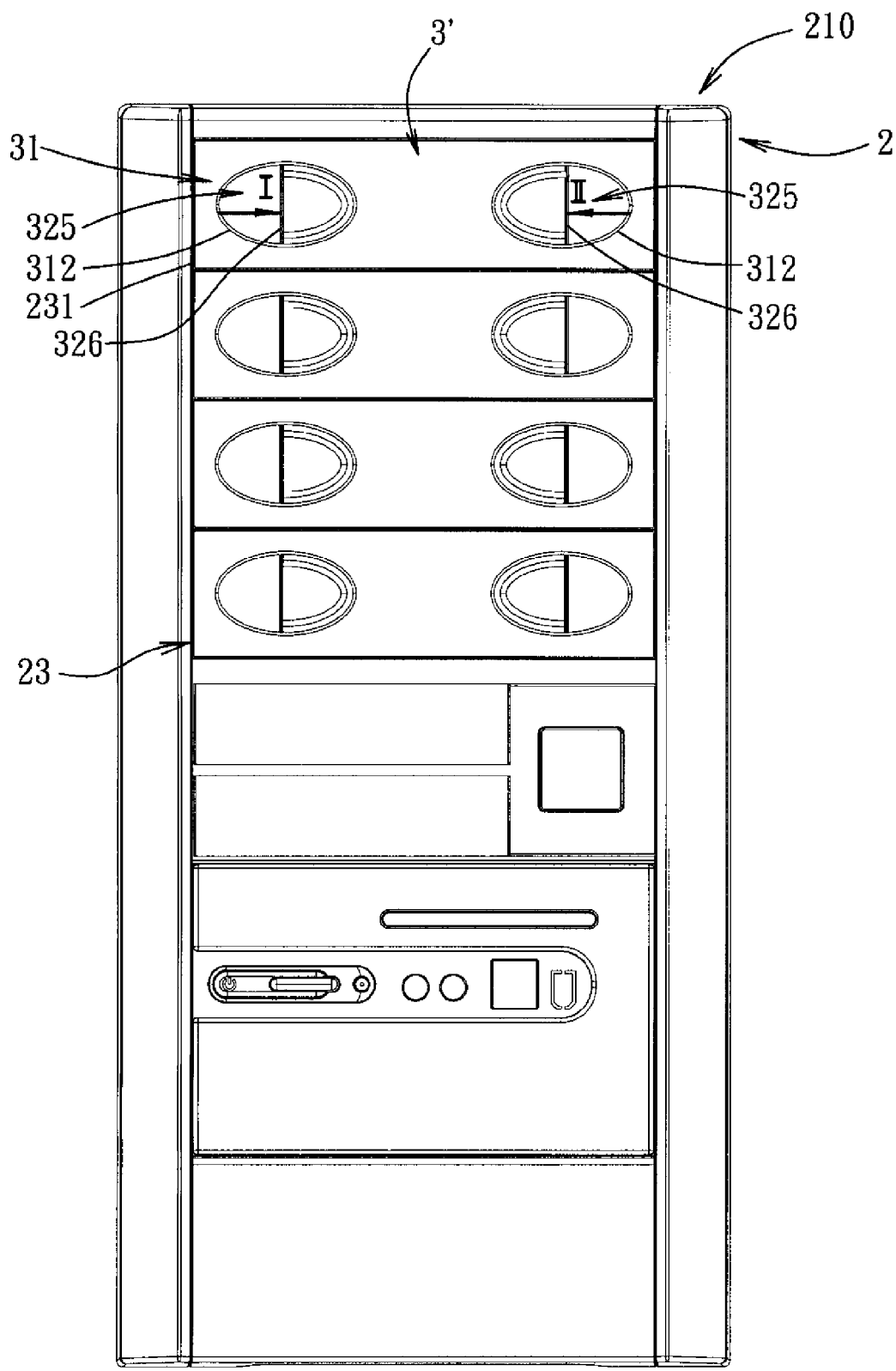
FIG. 12 is a front view of a second preferred embodiment of a face panel for a computer housing according to the present invention.
Figure 13:
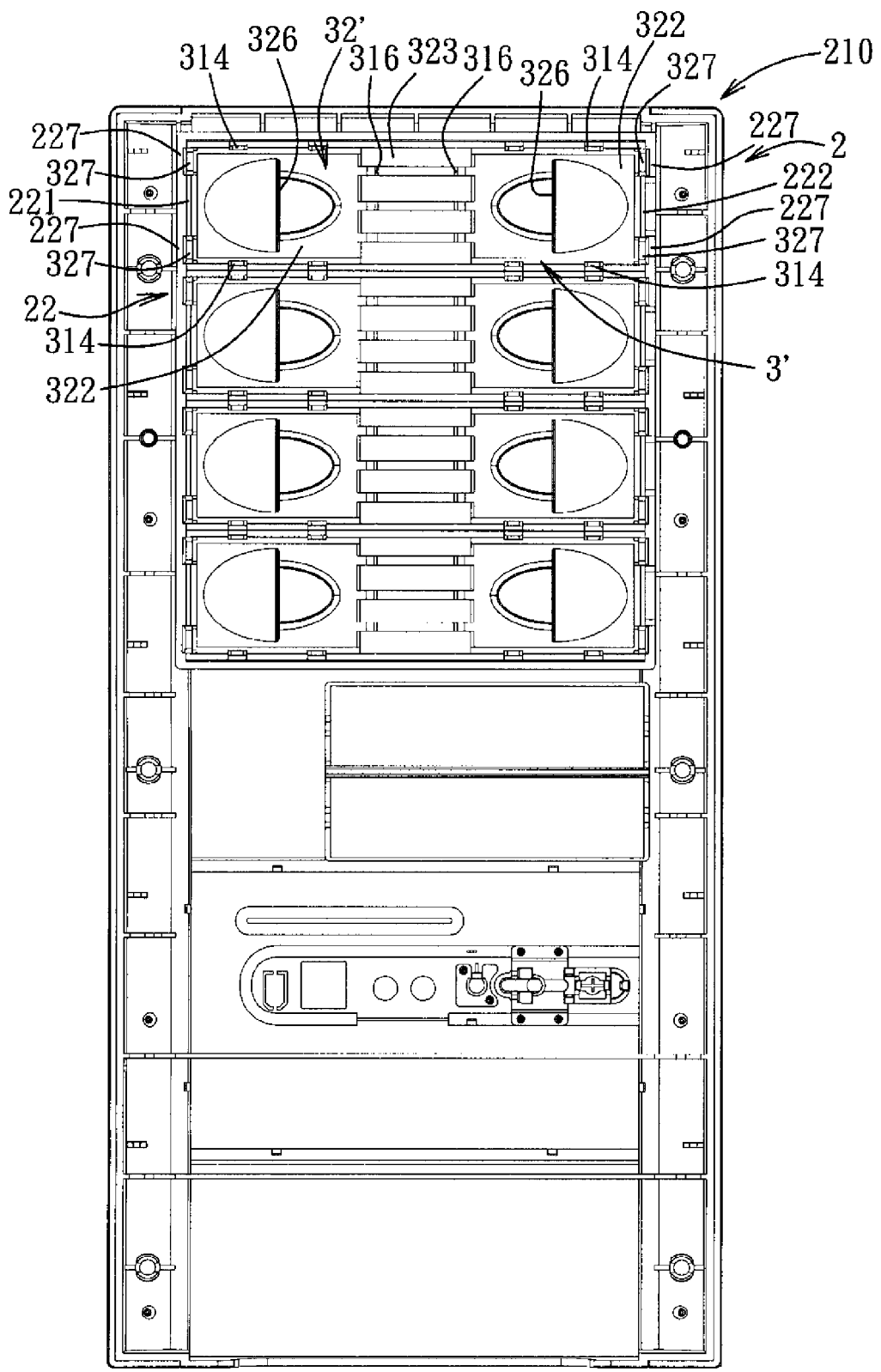
FIG. 13 is a rear view of the second preferred embodiment to illustrate a cover plate assembly and a face panel body in a locked state.
Figure 14:
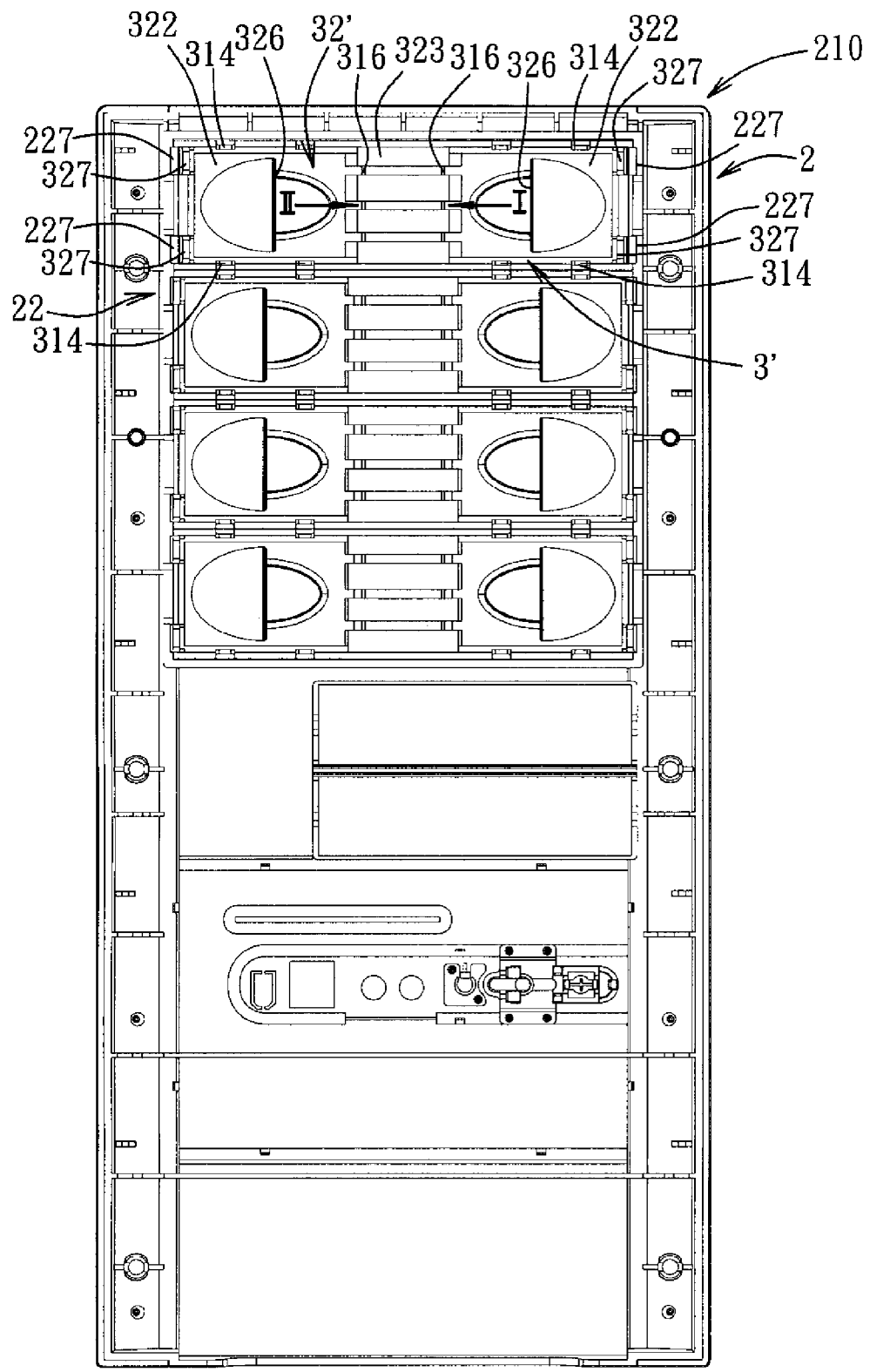
FIG. 14 is a rear view of the second preferred embodiment to illustrate the cover plate assembly and the face panel body in an unlocked state.

Reference is made to FIGS. 12, 13 and 14, which illustrate the second preferred embodiment of a face panel 210 for a computer housing according to the present invention. As shown, the cover plate assemblies 3' of the face panel 210 are slightly different from those of the first preferred embodiment in terms of overall structure and operation. Similarly, the cover plate assemblies 3' and components parts thereof will be referred to in singular terms where necessary to facilitate description.

The locking member 32' has two slide blocks 322 that are spaced apart from each other and that are respectively engaged with the positioning hooks 314 of the cover plate 31. Each of the resilient connecting portions 323 is integrally connected to the two slide blocks 322. Each of the slide blocks 322 includes two engaging hooks 327 for engaging two respective ones of engaging grooves 227 in the left and right side wall portions 221, 222 of the surrounding wall 22. The press portions 326 of the two slide blocks 322 are respectively exposed through two through holes 312 in the cover plate 31. Due to the resilient force provided by the resilient connecting portions 323, the engaging hooks 327 of the two slide blocks 322 are respectively engaged with the engaging grooves 227 in the left and right side wall portions 221, 222. Thus, the cover plate assembly 3' and the face panel body 2 are placed in a locked state.

When the user inserts two fingers respectively into the recesses 325 in the two slide blocks 322 and depresses the press portions 326 in directions respectively indicated by arrows (I) and (II), the two slide blocks 322 will move toward each other in the direction of the resilient connecting portions 323 and will simultaneously compress the resilient connecting portions 323 so that the resilient connecting portions 323 are deformed. When confronting ends of the two slide blocks 322 respectively abut against two stop portions 316 in the form of elongated ribs on the rear face of the plate body 311, the two slide blocks 322 are prevented from moving any further. At this time, the engaging hooks 327 of the two slide blocks 322 are completely disengaged from the engaging grooves 227, thereby placing the cover plate assembly 3' and the face panel body 2 in an unlocked state. In the unlocked state, the user can remove the cover plate assembly 3' from the mounting hole 23 through the opening 231.

In addition, when it is desired to re-assemble the cover plate assembly 3' to the face panel body 2, the cover plate assembly 3' is mounted in the mounting hole 23 through the opening 231. When the engaging hooks 327 of the two slide blocks 322 contact the left and right side wall portions 221, 222, the two slide blocks 322 will move toward each other in the direction of the resilient connecting portions 323. When the two slide blocks 322 are moved to where the engaging grooves 227 are, the engaging hooks 327 of the two slide blocks 322 will be brought to engage the engaging grooves 227 by virtue of the restoring resilient force of the resilient connecting portions 323. At this time, the cover plate assembly 3' and the face panel body 2 will be placed in the locked state.

In sum, in the two embodiments of the face panel 200, 210 for a computer housing as described above, with the arrangement of the cover plate assembly 3, 3', the user can use only one finger or two fingers to press the press portion(s) 326 of the slide block(s) 322 to release the locked state between the cover plate assembly 3, 3' and the face panel body 2. Thus, the cover plate assembly 3, 3' can be quickly and conveniently removed from the front side of the face panel body 2. In addition, by using the resilient connecting portions 323 to restore the second engaging hooks 324 or the engaging hooks 327 to an engaged position, the cover plate assembly 3, 3' is switchable between locked and unlocked states with respect to the face panel body 2.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements. In addition, it should be appreciated that any of the embodiments as described herein or any of the claims as appended hereto does not necessarily have to achieve all of the objects, advantages or features disclosed herein. Moreover, the title of the invention and the abstract of disclosure are provided herein to allow a searcher to quickly ascertain the subject matter of the technical disclosure of any patent issued on this application, and should not be relied upon to limit the scope of protection sought in this invention.

What is claimed is:

1. A face panel for a computer housing, comprising:
   a face panel body including a surrounding wall, and a mounting hole having a forward opening and defined by said surrounding wall, said surrounding wall having a first engaging groove and a second engaging groove located respectively at left and right sides thereof; and
   a cover plate assembly provided in said mounting hole and assembled to said surrounding wall, said cover plate assembly including:
   a cover plate having a through hole extending in a front-rear direction, and a first engaging hook for engaging said first engaging groove; and
   a locking member assembled to a rear face of said cover plate, and having a fixed block coupled to said cover plate, a slide block spaced apart from said fixed block, and at least one resilient connecting portion interconnecting said fixed block and said slide block so as to provide said slide block with a restoring resilient force, said slide block including a second engaging hook for engaging said second engaging groove, and a press portion that is exposed through said through hole and that is pressible to permit disengagement of said second engaging hook from said second engaging groove.

2. The face panel for a computer housing according to claim 1, wherein said resilient connecting portion is a curved strip structure.

3. The face panel for a computer housing according to claim 1, wherein said locking member has a plurality of said resilient connecting portions interconnecting said fixed block and said slide block for providing said slide block with the resilient restoring force, each of said resilient connecting portions being a curved strip structure.

4. The face panel for a computer housing according to claim 1, wherein said cover plate further has a plurality of positioning hooks projecting from said rear face of said cover plate, said positioning hooks respectively engaging upper and lower ends of said fixed block and upper and lower ends of said slide block.

5. The face panel for a computer housing according to claim 4, wherein said press portion is pressible so as to move said second engaging hook toward said fixed block.

6. The face panel for a computer housing according to claim 4, wherein said cover plate further has a limiting portion provided on said rear face thereof for abutting against a left side of said fixed block.

7. The face panel for a computer housing according to claim 4, wherein said cover plate further has a stop portion provided on said rear face thereof, said slide block abutting against said stop portion to limit movement of said slide block.

8. The face panel for a computer housing according to claim 2, wherein said cover plate further has a plurality of positioning hooks projecting from said rear face thereof, said positioning hooks respectively engaging upper and lower ends of said fixed block and upper and lower ends of said slide block.

9. The face panel for a computer housing according to claim 8, wherein said cover plate further has a limiting portion provided on said rear face thereof for abutting against a left side of said fixed block.

10. The face panel for a computer housing according to claim 8, wherein said cover plate further has a stop portion provided on said rear face thereof, said slide block abutting against said stop portion to limit movement of said slide block.

11. The face panel for a computer housing according to claim 3, wherein said cover plate further has a plurality of positioning hooks projecting from said rear face thereof, said positioning hooks respectively engaging upper and lower ends of said fixed block and upper and lower ends of said slide block.

12. The face panel for a computer housing according to claim 11, wherein said cover plate further has a limiting portion provided on said rear face thereof for abutting against a left side of said fixed block.

13. The face panel for a computer housing according to claim 11, wherein said cover plate further has a stop portion provided on said rear face thereof, said slide block abutting against said stop portion to limit movement of said slide block.

* * * * *